Oct. 16, 1951 C. E. HUNT, JR 2,571,720

CONTROL ARRANGEMENT FOR FACSIMILE APPARATUS

Filed Sept. 17, 1949 2 SHEETS—SHEET 1

CLAYTON E. HUNT, JR.
INVENTOR

BY Daniel J. Mayne
Rolla N. Carter
ATTORNEYS

CONTROL ARRANGEMENT FOR FACSIMILE APPARATUS

Filed Sept. 17, 1949 2 SHEETS—SHEET 2

CLAYTON E. HUNT, JR.
INVENTOR

BY
ATTORNEYS

Patented Oct. 16, 1951 2,571,720

UNITED STATES PATENT OFFICE 2,571,720

CONTROL ARRANGEMENT FOR FACSIMILE APPARATUS

Clayton E. Hunt, Jr., Rochester, N. Y., assignor to Eastman Kodak Company, Rochester, N. Y., a corporation of New Jersey Application September 17, 1949, Serial No. 116,359

6 Claims. (Cl. 178—6.6)

The present invention relates to facsimile apparatus and more particularly to control arrangements for insuring proper operation of such apparatus designed for recording on a continuous strip of material, sometimes called tape recording.

The preferred embodiment of the invention to be described in detail is a facsimile apparatus for reproducing on a paper tape printed matter, such as addresses, carried by business record cards. This apparatus operates continuously in the sense that the cards are stream-fed past a transmitter scanner, and a tape is uniformly drawn past a recording scanner; thus it is important that both scanning means be in condition to transmit and record signals whenever the cards and tape are being moved. Accordingly it is an object of the invention to provide such apparatus which insures that the scanning means are functioning before the cards and tape are moved.

In accordance with the invention, the scanning means, which for proper operation must rotate at a high speed, is provided with a separate drive which is brought up to speed before a drive for the cards and tape is actuated. The manner of obtaining this result is another object of the invention.

Also in accordance with the invention, a control arrangement is provided for stopping the apparatus whenever faulty operation causing a lack of recording signal persists for a predetermined time interval. The provision of such an arrangement is an object of the invention.

Figure 1:
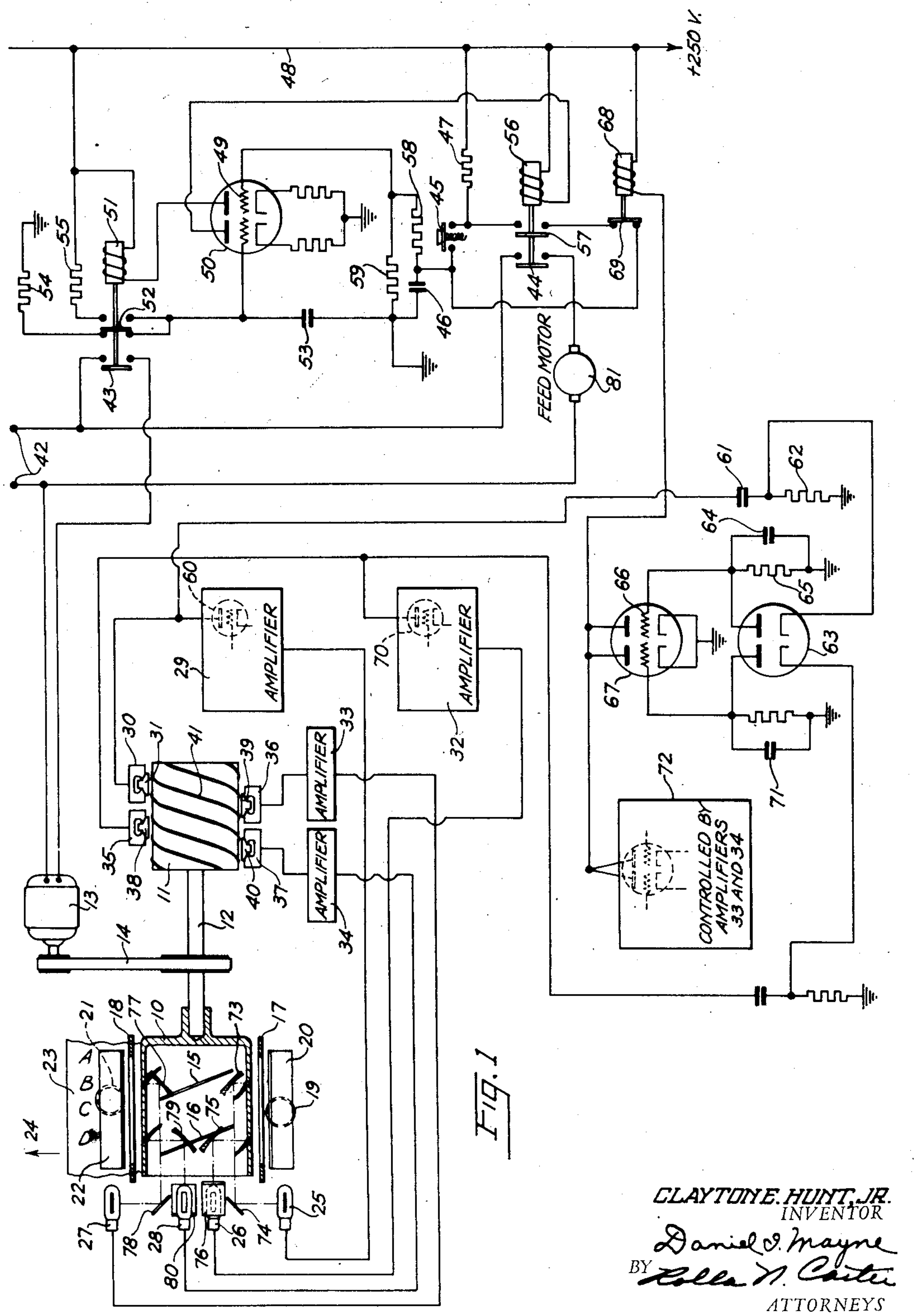
Figure 2:
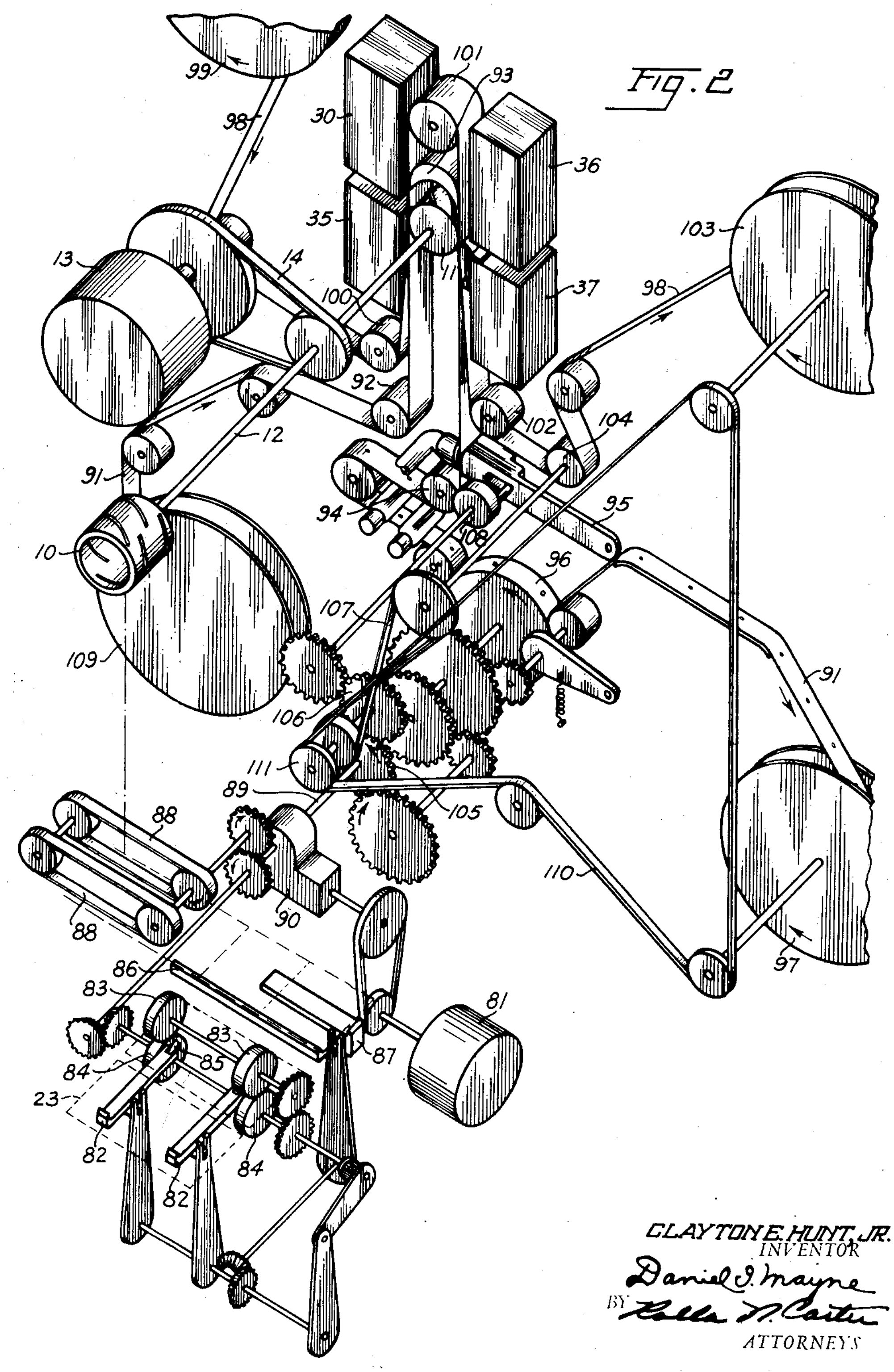

The invention itself, as well as other objects and advantages, will be understood from the following description of the accompanying drawings in which:

Fig. 1 is a diagrammatic showing, partly in section, of a scanning and control arrangement in accordance with the invention; and Fig. 2 is a perspective view of a preferred form of tape facsimile apparatus with which the invention may be employed.

The apparatus illustrated for the purpose of describing the invention is of the same type as that disclosed in my copending application, Serial No. 116,360, filed concurrently herewith, and includes a pick-up scanning drum 10 and a recording cylinder 11 mounted on a common shaft 12 and adapted to be rotated at a high speed by a motor 13 through a suitable power-transmitting means such as a belt 14. The drum 10 is provided with two axially spaced circumferential rows of helical slots 15 and 16. Diametrically positioned aperture plates 17 and 18 cooperate with the helical slots 15 and 16 to define elemental scanning areas which move progressively in an axial direction when the drum 10 rotates.

An optical system which may comprise an objective lens 19 and a mirror 20 is arranged to image its object plane in the plane of the aperture 17, and a similar optical system comprising an objective lens 21 and a mirror 22 is arranged to image its object plane in the plane of the aperture 18. The object planes of these two optical systems occupy a common plane, so that when an original such as a card 23 is positioned in this common plane, two longitudinally separated transverse areas of the card 23 are imaged on the apertures 17 and 18, respectively, and movement of the card 23 in the longitudinal direction indicated by an arrow 24 will cause each transverse area of the card 23 to be imaged successively on the apertures 17 and 18. The portions of the object planes of the lenses 19 and 21 which are imaged on the apertures 17 and 18 are hereinafter called stations.

The axial length of the helical slots 15 and 16 is slightly greater than the height of a line of print on the card 23 (assuming 1:1 magnification by the lenses 19 and 21) and their axial spacing equals the spacing of alternate lines of print on the card 23, so that as the card 23 moves through the first station, its first and third lines of print are imaged on the aperture 17 in position to be scanned by the helical slots 15 and 16, respectively. The arrangement of the lens 21 and the mirror 22 is such that when the card 23 moves through the second station, its second and fourth lines of print are imaged on the aperture 18 in position to be scanned by the helical slots 15 and 16. Light-sensitive cells 25 and 26 are provided to derive signals representative of the scansion values of the first and third lines of print, respectively. Similarly, light-sensitive cells 27 and 28 derive signals representative of the scansion values of the second and fourth lines of print, respectively.

The photoelectric means 25 has its output fed into an amplifier 29 which feeds to the winding of an electromagnetic driver 30 adapted to actuate a printer bar 31. Similarly, the outputs from the photoelectric means 26, 27, and 28 are fed through amplifiers 32, 33, and 34 to the windings of electromagnetic devices 35, 36, and 37, respectively, which actuate printer bars 38, 39, and 40.

The recording cylinder 11 carries helical ridges 41 correlated in number and pitch with the helical slots 15 and 16 in the scanning drum 10 so that all of the printer bars 31, 38, 39, and 40 are simultaneously scanned in proper phase with their actuating signals. As will be described below, a recording tape is drawn between the printer bars 31 and 38 and the cylinder 11 and then between the printer bars 39 and 40 and the cylinder 11 with a length of the tape in between corresponding to the separation of the two stations at the scanning drum 10.

The scanning motor 13 and a feed motor 81 for advancing the card 23 and the recording tape are adapted to be connected to a suitable source of electrical energy 42 through contacts 43 and 44, respectively, by pressing a push-button switch 45. Momentary closure of the switch 45 connects a condenser 46 through a resistance 47 to a bus bar 48 supplied with positive D. C. potential. As the condenser 46 becomes charged, it raises the potential of a grid 49 of a tube 50, which may be a 6SN7, so that the right side of the tube 50 conducts to energize a relay 51 connected in this output. Energization of the relay 51 closes the contact 43 and moves its other contact 52 to disconnect a condenser 53 from ground through a resistance 54 and to connect it to the bus bar 48 through a resistance 55. The closing of the contact 43 energized the motor 13 and while the condenser 53 is charging, the motor 13 has time to come up to speed. When the condenser 53 is charged, the left side of the tube 50 conducts to energize a relay coil 56, thereby closing its contacts 44 and 57. The closure of the contact 44 connects the feed motor 81 to the source of power 42, and the closure of the contact 57 establishes a holding circuit across the push-button switch 45 to maintain the charge on the condenser 46. The values chosen for the condenser 53 and the resistance 55 are such as will allow the motor 13 to drive the scanning devices 10 and 11 at their scanning speed (about three seconds in the present commercial embodiment). Also, the discharge circuit of the condenser 46 includes resistances 58 and 59 of such values that the condenser 46 retains a charge long enough to allow completion of the above cycle at the end of which the holding circuit is closed.

An output tube 60 in the amplifier 29 has a portion of its output directed through a condenser 61 and a resistor 62 to ground. The printing signal appearing across the resistor 62 is rectified by the right half of a rectifier tube 63 and employed to charge a condenser 64 by means of the drop across a resistance 65. The charge on the condenser 64 keeps the grid 66 of a triode in a tube 67 below cut off. Lack of a printing signal for any reason, including failure of the photocell 25, for a time interval long enough to permit the condenser 64 to discharge through the resistance 65 to the point where the bias on the grid 66 is above cut off, the tube 67 conducts to energize a relay 68 to open a normally closed contact 69 in the holding circuit around the push-button switch 45. The opening of the contact 69 disconnects the condenser 46 from the bus bar 48, and the condenser 46 starts discharging through the resistances 58 and 59, which soon lowers the bias on the grid 49 to cut off, thereby immediately releasing the relay 51 to open the circuit of the scanning motor 13 and to disconnect the condenser 53 from the bus bar 48 and connect it to ground through the resistance 54. The value of the resistance 54 is merely enough to prevent arcing at the contact 52 and introduces no appreciable time delay between the release of the relay 51 and the cutting off of the left side of the tube 50, which releases the relay 56 to open both the holding circuit around the push-button switch 45 and the circuit of the feed motor 81.

An output tube 70 in the amplifier 32 also has a portion of its output rectified by the tube 63 and employed to charge a condenser 71 to maintain the left side of the duotriode 67 non-conducting until failure of printing signal for a time interval after which the left side of the tube 67 conducts to energize the relay 68 with the above described results. Similarly, portions of the outputs of the amplifiers 33 and 34 may be employed to energize the relay 68 upon failure of printing signal. Such an arrangement is indicated by the block 72.

The light impressed with scansion values by the slot 15 and the aperture plate 17 may be directed onto the cell 25 by suitable surface mirrors 73 and 74 of which the mirror 73 is preferably concave. Similarly, light from the slot 16 and the aperture plate 17 is directed by mirrors 75 and 76 onto the cell 26, and the two light beams from the slots 15 and 16 and the aperture plate 18 are directed onto the cells 27 and 28 by mirrors 77 and 78 and mirrors 79 and 80, respectively.

Reference will now be made to Fig. 2, which shows a complete apparatus which may be controlled in accordance with the invention. The card and tape-handling means and the various drive mechanisms are described and claimed in co-pending application, Serial No. 116,310, filed concurrently herewith by Russell G. Thompson and are here described as an example of apparatus with which the invention has been employed.

As is more fully described in the above-identified Thompson application, the cards 23 to be reproduced are fed sidewise, one at a time, from the bottom of a stack by reciprocating pickers 82 between driven rollers 83 and 84 and then by reciprocating pushers 85 onto a conveyor track 86 where another reciprocating pusher 87 advances the cards lengthwise to conveyer belts 88 which carry the cards 23 through the two stations where they are scanned by the scanning drum 10. The sidewise feed of the cards 23 is at such a rate with respect to the lengthwise feed that the cards are overlapped with only the portions it is desired to scan exposed to the scanning means 10. The card-feeding means are driven in proper time relation by a main drive shaft 89 which may be driven through a gear box 90 by the feed motor 81. Obviously, the cards 23 need not be fed in overlapped relation, and of course the subject matter to be reproduced may be contained on a continuous strip rather than on discrete sheets.

A paper tape 91 upon which the recording is to be made is guided by a roller 92 and a stationary guide 93 along a path tangent to the recording cylinder 11 along a line coinciding with the recorders 30 and 35, and by the guide 93 and a roller 94 along a path tangent to the recording cylinder 11 along a line coinciding with the recorders 36 and 37. Prior to engaging the roller 94, the paper tape 91 passes a flying punch 95 which perforates the tape 91 consistent with the teeth on a sprocket drum 96 over the surface of which it passes on its way to a take-up reel 97.

A strip 98 of carbon transfer material supplied by a reel 99 is guided in overlying relation to the paper tape 91 at each recording station in succession by rollers 100, 101, and 102, and then to a take-up reel 103. The carbon paper strip 98 is drawn from the supply reel 99 and past the recording stations by a roller 104 driven by a gear 105 on the main drive shaft 89 through a gear 106 and a belt 107. The main drive shaft 89 through its gear 105 also drives the sprocket drum 96 and an eccentric 108 for actuating the punch 95 in a definite phase relation so that the perforations formed in the paper tape 91 by the punch 95 will register with the teeth of the sprocket drum 96 which serves to draw the paper tape 91 from its supply reel 109 and through its path past the recording stations and the flying punch 95. The take-up reels 97 and 103 for the paper tape 91 and the carbon strip 98, respectively, may also be driven by the main drive shaft 89 through a belt 110 driven by a pulley 111 rotatable with the gear 106.

The control arrangement of the invention as shown in Fig. 1 when applied to the apparatus of Fig. 2 will insure that the scanning devices 10 and 11 carried by the shaft 12 will have reached proper operating speed when the cards 23 and the paper tape 91 are started to move. This is especially important in preparing dick strips of addresses where it is essential that the address on each card be legibly reproduced if each subscriber is to receive the magazine or other literature upon which the address labels are to be placed. Also, if faulty operation results in the failure of recording signals, the control of the invention will eliminate or at least hold to a minimum any resulting illegible labels.

While the invention has been described as applied to a label printer having two scanning stations, it will be obvious that it is equally applicable to other forms of facsimile apparatus and regardless of whether the matter being recorded is an end product or merely a monitor recording. Many modifications of the invention will be evident to one skilled in the art without departing from the invention the scope of which is pointed out in the appended claims.

What I claim as new and desire to secure by Letters Patent of the United States is:

1. In a facsimile apparatus, a transmitter including rotatable scanning means for developing signals in accordance with subject matter to be transmitted, a recorder including rotatable scanning means for marking a recording medium in accordance with signals received from the transmitter, a rotatable shaft common to the rotatable scanning means of the transmitter and the recorder, a scanning motor for driving said shaft, a feed motor for advancing subject matter and a recording medium past the respective rotatable scanning means, a feed motor switch, an electrically operable switch for controlling the energization of the scanning motor, a push-button switch, a holding switch across the push-button switch, a capacitor, a charging circuit connected to the capacitor by the momentary closure of the push-button switch, means for controlling the electrically operable switch including an electric discharge device having a control electrode connected to the capacitor, said electric discharge device being conductive, when the capacitor is charged, to energize the electrically operable switch, a second capacitor adapted to be connected through a resistance to a source of electrical energy upon closure of the electrically operable switch, a second electric discharge device having a control electrode connected to the second capacitor so as to be conducting when the second capacitor becomes charged, a relay energized when the second electric discharge device is conducting for closing the feed motor switch and the holding switch, whereby the feed motor is energized a time interval after the scanner motor is energized determined by the charging rate of the second capacitor, such time interval being at least equal to the time required for the scanning motor to reach a desired speed after being energized.

2. In a facsimile apparatus, a rotatable scanner, a first electric motor for driving said scanner at high speed, means for advancing material of inconsiderable mass past said scanner to be scanned thereby, a second electric motor for driving the material advancing means, a capacitor, a resistor, switch means for simultaneously energizing the first electric motor and connecting the capacitor in charge varying relation with the resistor, and means responsive to a predetermined variation of the charge on the capacitor for energizing the second electric motor, the time constant of the capacitor and its associated resistor being at least equal to the interval required for the first electric motor to accelerate the scanner to the desired high speed.

3. In a facsimile apparatus, a transmitter including rotatable scanning means for developing signals in accordance with subject matter to be transmitted, a recorder including rotatable scanning means for marking a recording medium in accordance with signals received from the transmitter, a motor for driving both of said scanning means, a motor for feeding subject matter and a recording medium past the respective scanning means, a time delay control circuit, means for simultaneously energizing the scanning motor and the time delay control circuit, and means responsive to the control circuit after its delay time for energizing the feed motor, the delay time of the control circuit being chosen of such duration that the respective scanning means are being driven at proper scanning speed when the feed motor starts moving the subject matter and the recording medium.

4. Apparatus in accordance with claim 3 and wherein a time delay means operable in response to an absence of received signals for an interval greater than its delay time to cause deenergization of the scanning motor.

5. Apparatus in accordance with claim 4 and wherein means operated simultaneously with the deenergization of the scanning motor function to deenergize the feed motor without appreciable delay.

6. In a facsimile apparatus, a transmitter including rotatable scanning means for developing signals in accordance with subject matter to be transmitted, a recorder including rotatable scanning means for marking a recording medium in accordance with signals received from the transmitter, a first circuit including a motor for driving both of said scanning means, means having a common drive for feeding subject matter and a recording medium past the respective scanning means, a second circuit including a motor for rotating said common drive, manually operable means for energizing the first circuit, means operable upon the energization of the first circuit to energize the second circuit after a time interval, and means responsive to faulty operation of the apparatus for controlling the deenergization of both of said circuits.

CLAYTON E. HUNT, Jr.

REFERENCES CITED

The following references are of record in the file of this patent:

UNITED STATES PATENTS

| Number | Name | Date |
|---|---|---|
| 1,719,392 | Cooley | July 2, 1929 |
| 2,255,868 | Wise et al. | Sept. 19, 1941 |
| 2,371,956 | Dees | Mar. 20, 1945 |
| 2,443,953 | Gillespie | June 22, 1948 |
| 2,483,449 | Wise et al. | Oct. 4, 1949 |